(12) United States Patent
Wolfe

(10) Patent No.: US 6,397,246 B1
(45) Date of Patent: *May 28, 2002

(54) METHOD AND SYSTEM FOR PROCESSING DOCUMENT REQUESTS IN A NETWORK SYSTEM

(75) Inventor: Daniel Charles Wolfe, Tucson, AZ (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/192,092

(22) Filed: Nov. 13, 1998

(51) Int. Cl.[7] ............................................. G06F 15/16
(52) U.S. Cl. .................. 709/217; 713/201; 709/228; 709/225; 709/224
(58) Field of Search ................. 709/217, 228, 709/229, 224, 227; 705/10; 703/203, 2; 713/201

(56) References Cited

U.S. PATENT DOCUMENTS

| | | | |
|---|---|---|---|
| 5,572,643 A | | 11/1996 | Judson |
| 5,654,886 A | | 8/1997 | Zereski, Jr. et al. |
| 5,917,997 A | * | 6/1999 | Bell et al. .................. 395/182 |
| 5,948,061 A | | 9/1999 | Merriman et al. |
| 5,968,126 A | * | 10/1999 | Ekstrom et al. ............ 709/225 |
| 5,983,267 A | * | 11/1999 | Shklar et al. ............... 709/217 |
| 6,085,234 A | * | 7/2000 | Pitts et al. .................. 709/217 |
| 6,119,118 A | * | 9/2000 | Kain, III et al. ............. 707/10 |
| 6,128,663 A | * | 10/2000 | Thomas ...................... 709/228 |
| 6,154,777 A | * | 11/2000 | Ebrahim ..................... 709/227 |
| 6,195,622 B1 | * | 2/2001 | Alschuler et al. ............. 703/2 |

FOREIGN PATENT DOCUMENTS

WO  9726729  7/1997

* cited by examiner

Primary Examiner—David Wiley
Assistant Examiner—Firmin Backer
(74) Attorney, Agent, or Firm—David W. Victor; Konrad Raynes Victor & Mann LLP (57) ABSTRACT

Disclosed are methods and systems for processing a file request, such as a URL request for a web page. A computer system, such as a proxy server, receives a request from a client computer for a file at a file path location, such as a Universe Resource Locator (URL), in a network. A request attribute associated with the request from the processing system is determined. Rule information indicating at least one substitute file, e.g., web page, and an attribute associated with each substitute file is processed to determine whether the determined request attribute matches an attribute associated with one substitute file. The substitute file associated with the attribute that matches the request attribute is retrieved after determining that the request attribute matches the attribute associated with the substitute file. The retrieved substitute file is then returned to the processing system via the network. The substitute file may include advertisements or any other information that is presented to the client computer based on various attributes of the request.

39 Claims, 4 Drawing Sheets

METHOD AND SYSTEM FOR PROCESSING DOCUMENT REQUESTS IN A NETWORK SYSTEM

BACKGROUND OF THE INVENTION

1. Field of the Invention

The present invention relates to a method and system for processing document requests in a network system and, in particular, for processing requests for web pages using a proxy server.

2. Description of the Related Art

The Internet, otherwise known as the World Wide Web, is developing into one of the most widely used mediums for delivering advertisements and information. Many providers of content and information on the Internet ("content providers") are able to offer their content free of charge because of the revenue they generate from selling advertising space. Advertisements are included in the Web pages that include the user requested content and information. For instance, newspapers often allow Internet users free access to their daily editions. The low cost of providing access to Web pages including the daily newspaper content may be offset by the revenue generated from selling advertisement space on the newspaper Web pages. In fact, every Web page of newspaper content can include advertisements. Some newspaper providers on the Internet are spreading the content from a single article across multiple Web pages to provide different advertisements in each Web page. This requires the user to view multiple Web pages of advertisements in order to read the entire article. Advertisers often find Internet advertisement highly effective because Internet users can access the advertisers' Internet Web page by double-clicking the displayed advertisement and obtain further information on the advertiser and information on how to order products.

An Internet user at a client computer typically uses an Internet Web browser, also known as an Hyper Text Protocal (HTTP) client, that can process Web pages coded in the Hyper Text Markup Language (HTML) format. The HTTP client sends a request message to a server over the Internet which includes HTTP server software to process the request message. The request message typically includes a Universal Resource Locator (URL) which specifies the path of the requested information on the Internet and the name of the file at the specified path. The HTTP server processes the request and returns the requested file at the URL if it is available as part of a response message to the requesting HTTP client.

With current Internet advertising techniques, when an Internet user requests a file from an HTTP server in the form of an HTML Web page, the HTTP server transmits the user the requested HTML Web page including URL links to various advertisers. The advertisements, including the URL links to the advertisers' web pages, are displayed in the HTML Web page at the user's HTTP client computer. If the user at the HTTP client computer selects one of the displayed ads, the user's HTTP client will send a request message for an HTTP Web page to the advertiser's HTTP server. The advertiser's HTTP server will then provide the HTTP client with a Web page from the advertiser's Internet Web site.

With such current techniques, only content providers, such as news services, are able to offer advertising. The content providers embed URL links to the advertisers's web pages along with the requested Web page. Thus, the content providers are the primary Internet servers that are in the unique position of being able to tailor and determine how information is presented to Internet users and, in the process, earn advertising revenue.

There is a need in the art for technology and methodology to allow entities other than the content providers to present and control how information is provided to Internet users.

SUMMARY OF THE PREFERRED EMBODIMENTS

To overcome the limitations in the prior art described above, preferred embodiments disclose a method and system for processing a file request. A request is received from a client computer for a file at a file path location in a network. A request attribute associated with the request from the client computer is determined. Rule information indicating at least one substitute file and an attribute associated with each substitute file is processed to determine whether the determined request attribute matches an attribute associated with one substitute file. The substitute file associated with the attribute that matches the request attribute is retrieved after determining that the request attribute matches the attribute associated with the substitute file. The retrieved substitute file is then returned to the client computer via the network.

In further embodiment, the requested file is included in a first server. A second server performs the steps of receiving the request, determining the request attribute, processing rule information, determining whether the request attribute matches, retrieving the substitute file, and returning the substitute file to the processing system. The first server, client computer, and second server communicate over the network.

In yet further embodiments, the attribute associated with the substitute file is a member of the set of attributes comprising a file path location, an address identifier, and a time range and the request attribute associated with the request is a member of the set of request attributes comprising a file path location, an address identifier, and a time range.

In still further embodiments, the substitute file and requested file are in a Standard Generalized Markup Language (SGML). In such case, the retrieved substitute file may be modified to include a hypertext reference to the file path location of the requested file.

With preferred embodiments, a substitute file, such as a file containing advertisements or other relevant information, may be provided to a requesting client computer when the request is associated with a particular attribute. A plurality of substitute files may each be associated with attributes. In this way, a substitute file can be presented in lieu of the requested file based on one or more request attributes associated with the client request. For instance, if the attribute is a particular Universal Resource Identifier (URI) or Universal Resource Locator (URL), then the substitute file would be presented to the requesting client when the URL of the requested file matches the attribute URL of the substitute file.

Preferred embodiments are particularly applicable in an advertising context when a user requests a file located on a content server by first sending the request to a proxy server. The proxy server may be maintained by the user's Internet Service Provider (ISP). The requested file may be an HTML file and the content server may be an Internet site that regularly provides content, such as the CNN and New York Times Internet web sites. Preferred embodiments allow the proxy server to return specific advertisement pages or other information pages to the requesting client in lieu of the requested file based on various attributes of the request, such as the URL of the request, the DNS name of the requesting client, and other factors. In this way, the proxy server can tailor advertisements presented to requesting clients according to a rule based system.

BRIEF DESCRIPTION OF THE DRAWINGS

Referring now to the drawings in which like reference numbers represents corresponding parts throughout.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Hardware and Software Environment

Figure 1:
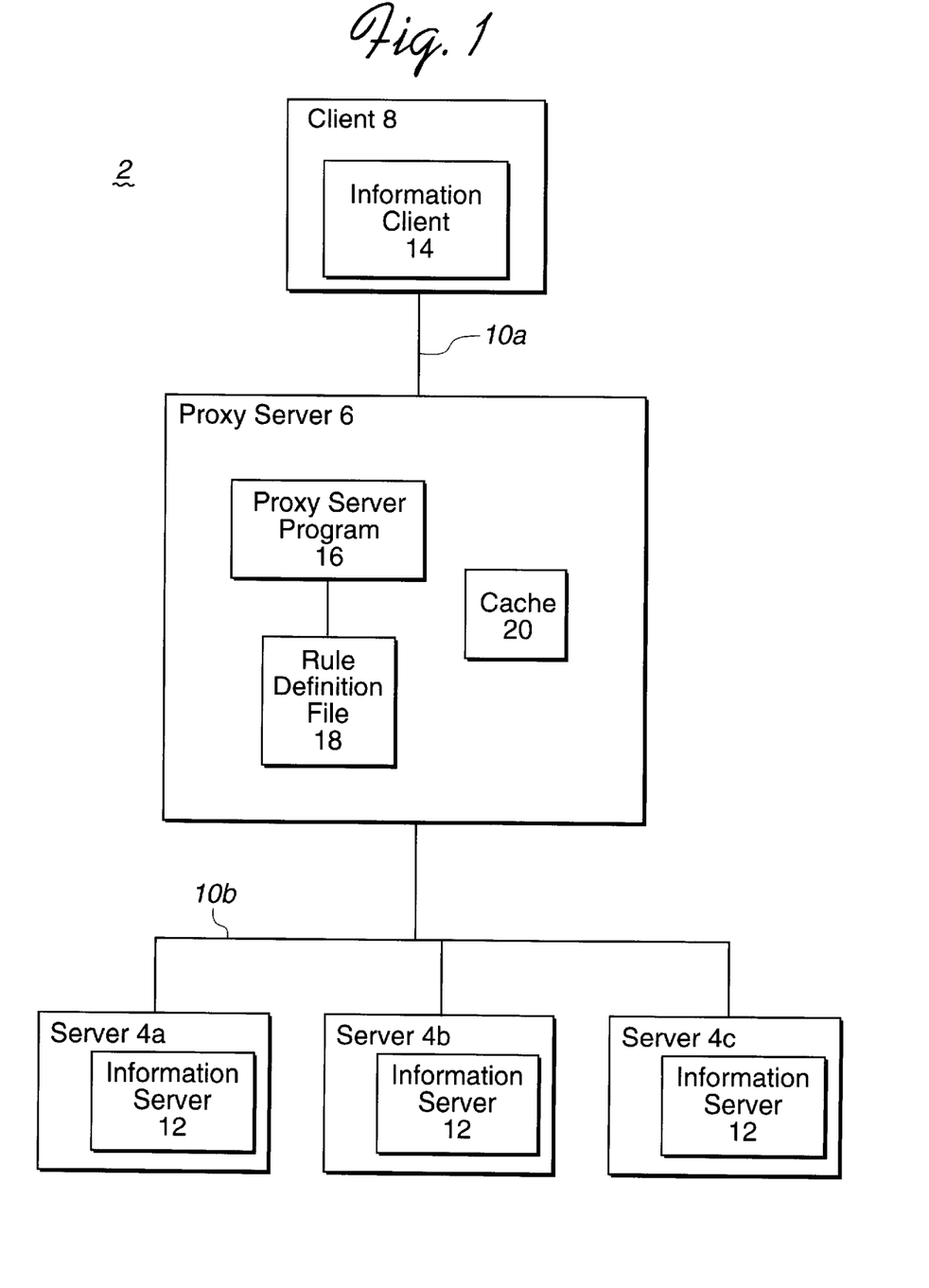
FIG. 1 is a block diagram illustrating a software and hardware environment in which preferred embodiments of the present invention are implemented.

FIG. 1 illustrates a hardware and software environment in which preferred embodiments of the present invention are implemented. A network 2 consists of servers 4a, b, c, a proxy server 6, and a client 8 that communicate over networks 10a, b. The servers 4a, b, c include an information server 12 program, such as the HTTP server protocol software. The client 8 includes an information client 14, such as a web browser which includes HTTP client software for communicating with the information server 12 program. The client 8 communicates with the proxy server 6 via network 10a, and the proxy server 6 communicates with servers 4a, b, c via network 10b. The networks 10a, b may be a TCP/IP network, such as the Internet and World Wide Web, or any other network system known in the art. The proxy server 6 includes a proxy server program 16. The proxy server program 16 is capable of functioning as both an information server 12 and client 14, and capable of implementing both the client and server functions for web protocols such as HTTP, FTP, Gopher, WAIS, NNTP, etc. The proxy server program 16 may include features of proxy programs known in the art, such as the MICROSOFT® Proxy Server software, Squid, etc., and additional programming elements to implement the preferred embodiments of the present invention. Squid is a proxy server program copyrighted by the University of California San Diego and Duane Wessels; MICROSOFT is a registered trademark of the Microsoft Corporation.

In preferred embodiments, the servers 4a, b, c, proxy server 6, and client 8 may be any computer system or processing device known in the art, such as a personal computer, workstation, mainframe, portable computer, personal digital assistant, etc. In preferred embodiments, the information client 14 generates a user interface that allows the user to use the client 8 computer to access the other systems 6, 4a, b, c, over the networks 10a, b. The information client 14 may be an Internet browser program capable of interpreting, requesting, and displaying files in the HTML format, e.g., NETSCAPE® Communicator, the MICROSOFT® Internet Explorer, Spry Mosaic, NCSA Mosaic, Lynx, Opera, GNUscape Navigator et. NETSCAPE is a registered trademark of the Netscape Communications Corporation. The information server 12 included in the servers 4a, b, c may be the HTTP server protocol or any other file retrieval software known in the art. The HTTP server protocol is described in "Hypertext Transfer Protocol—HTTP/1.1," Network Working Group, Request for Comments No. 2068 (January, 1997), which publication is incorporated herein by reference in its entirety.

When the information client 14 transmits a request for a file at a URL address at one of the servers 4a, b, c, the request is transferred via the network 10a to the proxy server 6. The proxy server program 16 processes the file request, functioning as an information server 12. In preferred embodiments, when processing a file or URL request from the information client 14, the proxy server program 16 processes a rule definition file 18 stored in the proxy server 6 to determine how to process the information request received from the information client 14. The proxy server 6 may further include a cache 20, implemented in either volatile or non-volatile memory, to store documents, such as Web pages, previously accessed by the client 8.

In certain embodiments, the proxy server 6 and client 8 may be in an Intranet, and the proxy server 6 provides a gateway through which the client 8 must pass to access the World Wide Web or other external sites. In such case, the proxy server program 16 may include a firewall and filtering functions to provide security and control access to prohibited external Internet sites. Alternatively, the network 10a may be a dedicated connection operated by an Internet Service Provider (ISP), such as a cable or other high speed connection. In such case, the proxy server 6 provides clients 8 access to the network 10b, which may be the Internet. Still further, the client 8 may communicate with the proxy server 6 via a phone or modem connection through the Internet. In such case, the client 8 would access the World Wide Web through the proxy server 6. The proxy server program 16 may further include caching algorithms to store in cache 20 files retrieved from the servers 4a, b, c. In this way, the proxy server 6 can respond to a request from the client 8 from cache 20 if the requested document was previously retrieved from the servers 4a, b, c and stored in cache 20.

Rule Definition File

Figure 2:
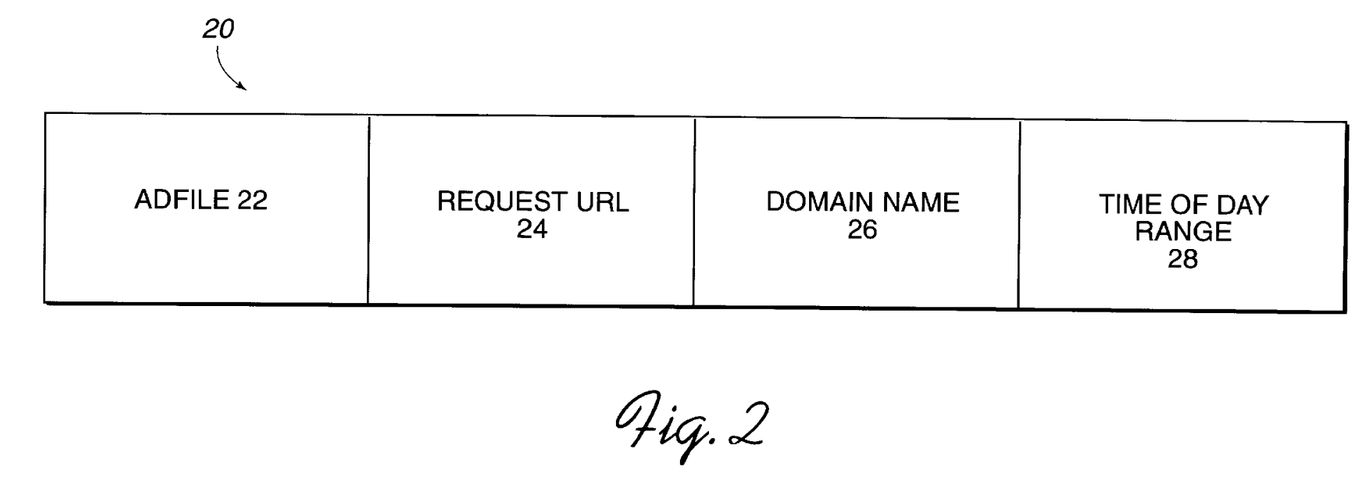
FIG. 2 illustrates a data structure of attributes associated with a particular substitute file, referred to as the ADFILE, in accordance with preferred embodiments of the present invention.

Preferred embodiments include a rule definition file 18 which the proxy server program 16 processes to determine how to process a request for a document from the information client 14. A rule definition file 18 is comprised of a plurality of rules or separate records. FIG. 2 illustrates the fields maintained for a rule 20, including an ADFILE field 22, a REQUEST URL field 24, a DOMAIN NAME field 26, and a TIME OF DAY RANGE field 28. The ADFILE field 22 provides the URL of the substitute file to be transmitted in lieu of the requested URL. In preferred embodiments the substitute file at the ADFILE 22 URL is an HTML document including various advertisements. The REQUEST URL field 24 is the address information or URL associated with the ADFILE URL that a client 8 may request. In this way, the proxy server program 16 returns the document at the ADFILE URL when the client 8 requests the file at the REQUEST URL. The DOMAIN NAME field 26 indicates a domain name service (DNS) name which identifies a family of IP addresses. This field 26 is used for further checking such that the substitute file at the ADFILE URL is returned when the DNS name associated with the client 8 matches the DNS name in the DOMAIN NAME field 26. The DOMAIN NAME field 26 may indicate hosts and clients 8 at a particular geographical location, e.g., specific city in the United States, or a particular Internet Service Provider (ISP). The DOMAIN NAME field 26 is compared with the DNS name associated with the client 8. In this way, the DOMAIN NAME field 26 allows ads to be tailored depending on the DNS name of the requesting client 8. In alternative embodiments, the DOMAIN NAME field 26 may be any type of address identification information, such as the actual IP address of the client 8 instead of a family of IP addresses of which the client 8 is a member. The TIME OF DAY RANGE field 28 specifies a time of day range associated with a particular ADFILE URL. This field is used for still further checking such that the document at the ADFILE URL is returned when the client 8 requests the associated REQUEST URL and when the time of day falls within the value indicated in the TIME OF DAY RANGE FIELD 28.

In preferred embodiments, the rule records 20 in the rule definition file 18 may be comprised of lines of text. Below is an example of three rule records 20:

| | | | |
|---|---|---|---|
| http://www.proxyserver.com/ad1 | http://www.cnn.com | ibm.com | 12:00 PM thru 12:00 AM |
| http://www.proxyserver.com/ad2 | http://www.wsj.com | netcom.net | 1:00 AM thru 7:00 AM |
| http://www.proxyserver.com/ad3 | http://www.cnn.com | earthlink.net | 12:00 PM thru 12:00 AM |

Each rule record comprises a line of text wherein the ADFILE 22, REQUEST URL 24, DOMAIN NAME 26, AND TIME OF DAY 28 fields are separated by spaces. For instance, the first record, i.e., the first line, identifies the ADFILE as the file at the URL "http://www.proxyserver.com/ad1," which may be a file maintained in a storage space of the proxy server 6. The REQUEST URL for the first record is "www.cnn.com." i.e., the Cable News Network home page. Thus, the advertisement at the ADFILE URL is associated with the CNN home page. The third field "ibm.com" indicates the DNS of the requesting client 8 to which the particular ADFILE URL applies. Further, the fourth field, "12:00 PM thru 12:00 AM" indicates a time of day range further associated with the ADFILE. The proxy server program 16 would return the substitute file "ad1" if a client 8 having the DNS name "ibm.com", i.e., part of the family of IP addresses managed from the IBM server, requested the CNN web page between 12:00 PM and 12:00 AM.

Figure 3A:
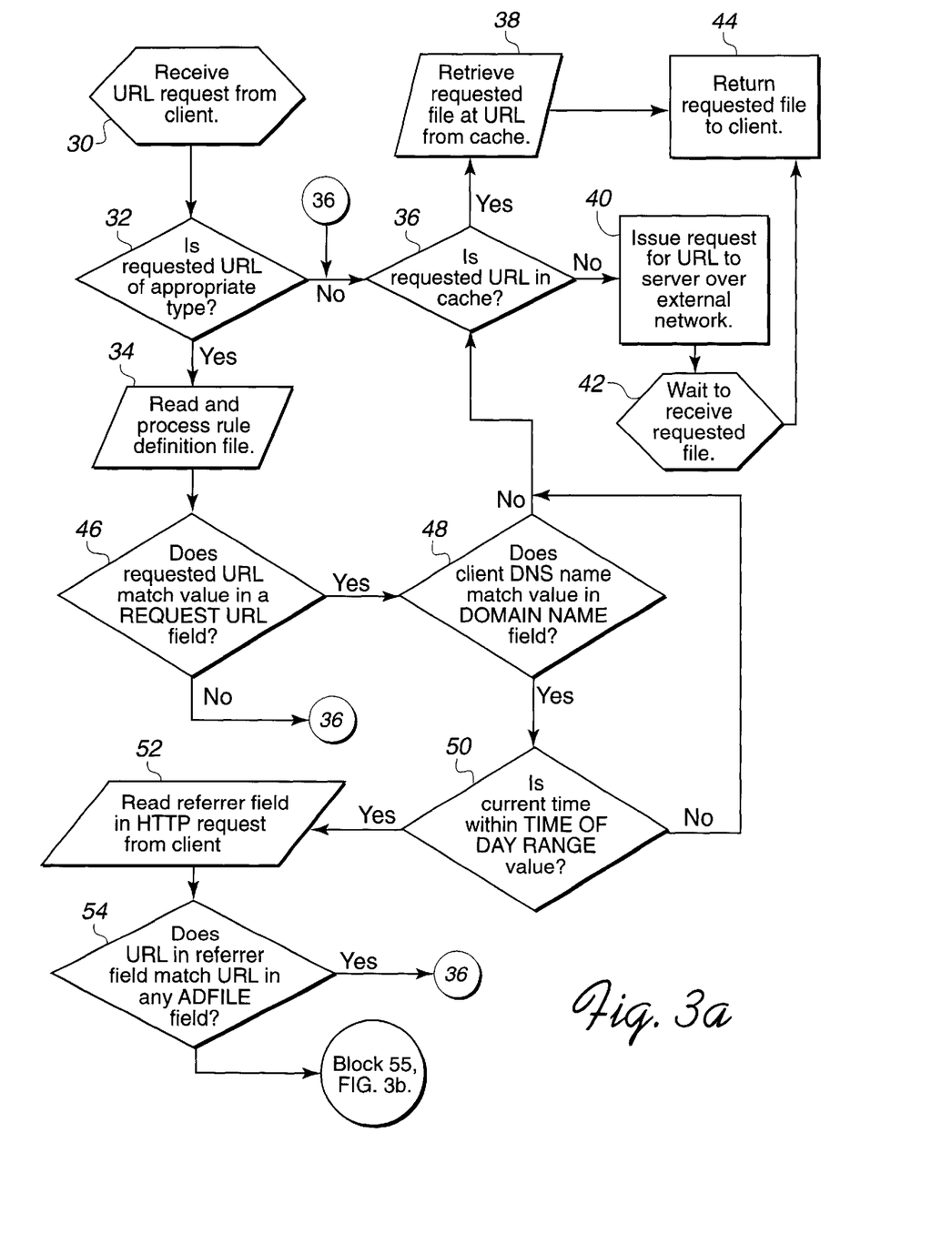
FIGS. 3a, b illustrate logic to process a request for a file from a client in accordance with preferred embodiments of the present invention.
Figure 3B:
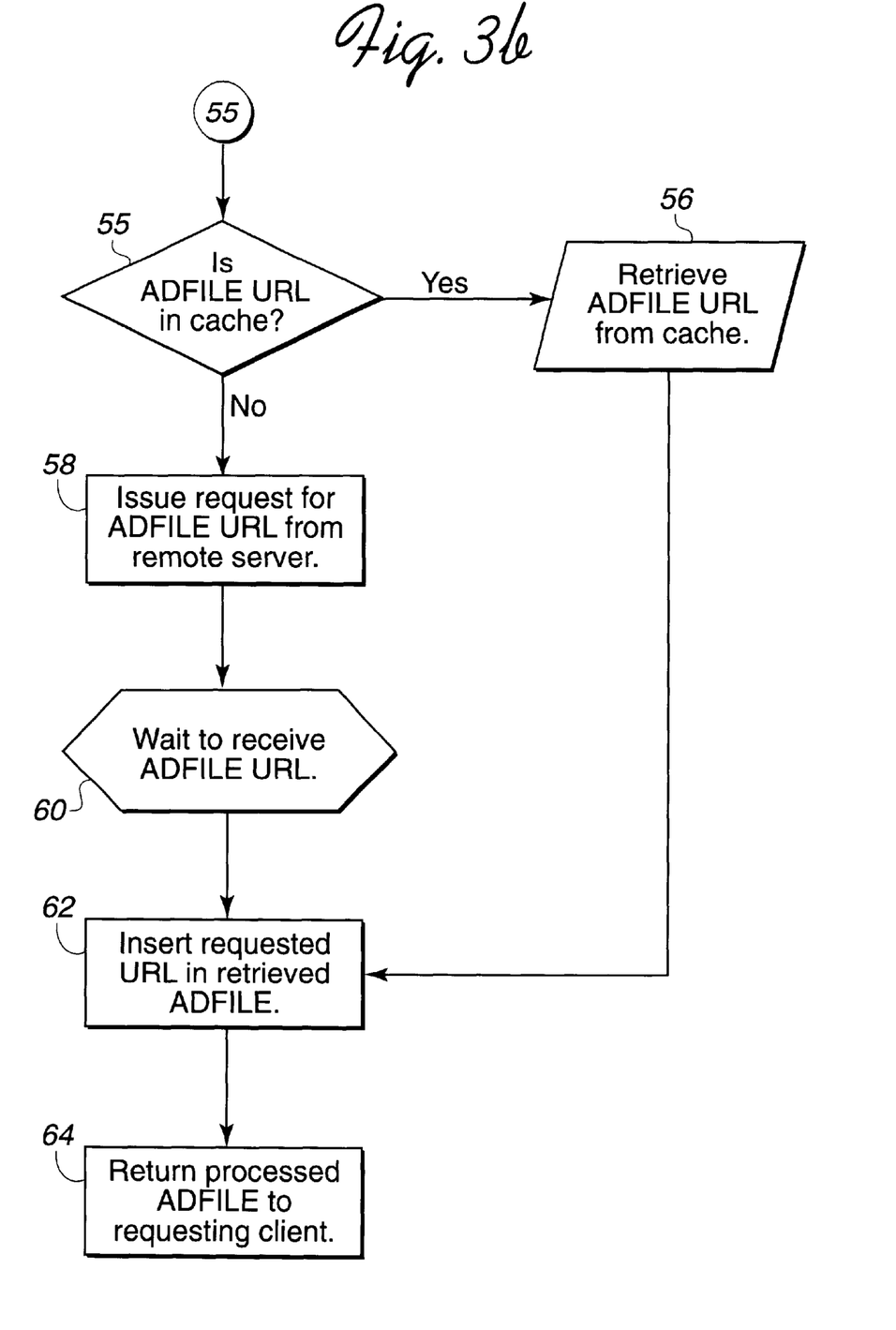

FIGS. 3a, b illustrate logic implemented in the proxy server program 16 to process a request for a document at a URL from the client 8. In preferred embodiments, the information client 14 submits a request using the HTTP protocol, such as the HTTP GET command, for a document at a particular URL. Control begins at block 30 which represents the proxy server program 16 processing a URL request. As discussed, the proxy server program 16 includes both HTTP server and client protocols to process both requests from the client 8 and submit requests to other servers 4a, b, c. Control transfers to block 32 which represents the proxy server program 16 determining whether the requested URL is of an appropriate file type, such as a text file or HTML file. The requested file type may be indicated by the suffix to the URL, such as .HTM or .HTML. In further embodiments, the proxy server program 16 may determine dynamically whether the content type is of the appropriate type, e.g., HTML, by first retrieving the requested URL and parsing the header of the retrieved URL. This addresses the situation where the HTML content is obtained from a Common Gateway Interface (CGI) program at the specified URL. By making the determination of whether the requested file is of the appropriate type, the proxy server program 18 avoids attempting to insert information in a non-HTML type file, such as a graphic file, e.g., JPG, GIF, MPEG, etc.

If the requested file is of the appropriate type, then control transfers to block 34; otherwise, control transfers to block 36 where the proxy server program 16 determines whether the requested URL in the GET command is in cache 20. If so, control transfers to block 38; otherwise, control transfers to block 40 where the proxy server program 16 issues an HTTP command to request the file at the URL from a server 4a, b, c over the network 10b. In this case, the proxy server program 16 functions as an HTTP client requesting information from another information server 12. From block 40, control transfers to block 42 where the proxy server program 16 waits until the requested file is received. At block 38, the proxy server program 16 retrieves the requested file from the cache 20. From block 38 or 42, control transfers to block 44 to return the requested file to the client 8 via the network 10a.

If, at block 32, the proxy server program 16 determined that the requested URL was of the appropriate type, then control transfers to block 34 where the proxy server program 16 reads and processes the rule definition file 18. Control then transfers to block 46 where the proxy server program 16 determines whether the requested URL matches a value in one of the REQUESTED URL fields 24 in one of the records in the rule definition file 18. If a match occurs, then control transfers to block 48; otherwise, control transfers to block 36 where the proxy server program 16 retrieves the requested file from cache 20 or from the information server 12. At block 48, the proxy server program 16 determines whether the DNS name of the client 8 matches the value in the DOMAIN NAME field 26 associated with the ADFILE 22 that includes the matching REQUESTED URL field 24 determined at block 46. If so, control transfers to block 50; otherwise, control transfers to block 36 to return the file at the URL. At block 50, the proxy server program 16 determines whether the current time of day, as indicated by a time indicator in the proxy server 6, is within the range value in the TIME OF DAY RANGE field 28 associated with the ADFILE 22 having the matching REQUEST URL 24 and DOMAIN NAME field 26 determined at blocks 46 and 48. If so, control transfers to block 52; otherwise, control transfers to block 36 to return the file at the URL.

If the file request satisfies the matching determinations made at block 46, 48, and 50, then control transfers to block 52 where the proxy server program 6 reads the referer field in the HTTP request from the client 8. The HTTP request from the client 8 includes a request-header field in which the information client 14 passes additional information about the request and the client 8 to the proxy server 6. The request header field may include the referer field in which the information client 14 may specify the address of the resource from which the Request URL was made. Alternatively, the address may be a Uniform Resource Identifier (URI), which is the generic term for all types of names and addresses that refer to objects on the World Wide Web. A URL is one kind of URI. Control then transfers to block 54 where the proxy server program 16 determines whether the URL of the referer matches the URL in any ADFILE field 22 in the rule definition file 18. A match indicates that the current request from client 8 being processed was made from a substitute file (ADFILE) previously transmitted to the client 8 in lieu of the actual file or URL the client requested. In preferred embodiments, the proxy server program 16 does not provide a substitute ADFILE (advertisement) a second time when a client request is from an advertisement (ADFILE). In alternative embodiments, the proxy server program 16 may provide the ADFILE multiple times when the request is from an ADFILE.

If the referer matches one of the ADFILE URLs, then control transfers to block 36 to retrieve requested URL. Otherwise, control transfers to block 55 in FIG. 3b where the proxy server program 6 determines whether the substitute ADFILE URL is in cache 20. If so, control transfers to block 56; otherwise, control transfers to block 58. At block 56, the proxy server program 6 retrieves the substitute ADFILE in the matching record from cache 20. If the file for the ADFILE URL is not in cache 20, then control transfers to block 58 where the proxy server program 6 issues a request for the ADFILE URL, such as an HTTP GET command, to a remote server 4a, b, c or perhaps a local storage location within the network 10a connecting the proxy server 6 and client 8. Control then transfers to block 60 where the proxy server program 16 waits to receive the file at the requested ADFILE URL.

Control then transfers to block 62 where the proxy server program 16 inserts a link to the requested URL into the retrieved substitute file (ADFILE). In preferred embodiments, the proxy server program 16 would modify the ADFILE HTML (substitute) file to insert the requested URL at an HREF link to allow the user to select the highlighted hypertext link to go from the ADFILE HTML Web page (substitute file) to the originally requested URL Web page. In preferred embodiments, the proxy server program 16 must also modify the content and length information in the header to specify the nature of the requested URL included as a link in the ADFILE, e.g., "text/html", "image/png", "image/gif", "video/mpeg", "audio/basic", "text/tcl", "text/javascript", "text/vbscript", etc. The proxy server program 16 would also modify the length information in the header to indicate the additional space in the ADFILE HTML file needed to accommodate the added link to the requested URL. Further details of implementing the HTML language are described in the "HTML 4.0 Specification.". published as a W3C Recommendation (April 1998), which is available on the World Wide Web at "http://www.w3.org/TR/REC-html40/" and which publication is incorporated herein by reference in its entirety.

In preferred embodiments, the link to the requested URL is added to the substitute ADFILE web page at a location that causes the user to view the advertisements and, at the same time, conveniently present the link to the requested URL. The link to the requested URL may be displayed at the bottom of the displayed substitute file (advertisement) or at any other location.

Control then transfers to block 64 to return the processed substitute ADFILE web page with the inserted URL link to the requesting client 8.

Thus, with the preferred embodiments, a proxy server program 16 can cause the presentation of an informational, e.g., advertising, Web page before presenting the requesting client 8 the Web page at the requested URL. This is especially useful for the purpose of presenting advertisements. For instance, an Internet Service Provider (ISP) can use the preferred embodiments to present customers an advertisement Web page before presenting the requested Web page. To compensate the user for the inconvenience, the ISP may offer Internet access free of charge or at a discounted rate. In this way, the ISP can sell advertising space and allow the advertiser to select the requested URLs, domain names, and time of day range that will trigger a presentation of an advertisement. For instance, the Los Angeles Dodgers can purchase advertising space on an ADFILE web page that is presented when the client requests the ESPN® URL or when the client 8 has a DNS name that is in the Los Angeles area. ESPN is a registered trademark of Starwave, Inc.

Moreover, with preferred embodiments, the proxy server program 16 can tailor the type of information presented, e.g., the specific ADFILE web page, based on the requested URL, the location of the requesting client 8 or the time of day.

Alternative Embodiments and Conclusions

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

In preferred embodiments, the logic of FIGS. 3a, b is implemented as software logic. In further embodiments, the logic of FIGS. 3a, b may be implemented as hardware or as a combination of hardware and software logic. The preferred logic of FIGS. 3a, b is for illustrative purposes, such that steps may be added, removed, and the sequence of steps changed.

Preferred embodiments were described with respect to the HTTP protocol for transmitting documents between computers within a network. However, those skilled in the art will appreciate that the preferred embodiments may apply to any communication protocol for allowing a client to request and access files in a network environment.

Preferred embodiments were described with respect to the HTML file format. However, alternative file formats for building web-like pages may be used, such as Dynamic Hypertext Mark-Up Language (DHTML), the Extensible Markup Language (XML), any other Standard Generalized Markup Language (SGML), or any other language known in the art for creating interchangeable, structured documents. In yet further embodiments, the requested file may be in a non-SGML file format, e.g., a text file format, i.e., capable of being displayed by the requesting client.

Preferred embodiments were described with respect to presenting a substitute ADFILE before the user could retrieve the file at the requested URL. However, in alternative embodiments, the ADFILE may be presented to the client 8 after the web page at the requested URL is provided to the user or at some other moment in processing the client request.

Preferred embodiments were described with respect to the presentation of an ADFILE web page, i.e., advertisement Web page, before providing the requesting client the requested file. However, the preferred embodiments may be used to present any type of substitute Web page or substitute file, not just advertisements, based upon the user request. For instance, preferred embodiments may be used to provide a substitute Web page that includes a link to the requested URL to provide additional information to the requesting client that is relevant to the requested URL. The substitute file may include supplemental information relevant to the information available at the requested URL, such as related links, or a warning not to proceed to the requested URL if the information at the requested URL raises security concerns or is off-limits to the requesting client, i.e., inappropriate content.

The described embodiments included three attributes associated with a particular ADFILE—REQUESTED URL, DOMAIN NAME, TIME OF DAY RANGE—that were used to determine whether to present a substitute Web page (ADFILE) including a link to the requested URL before presenting the requested Web page. The attributes associated with an ADFILE would be compared against request attributes associated with the request from the client. However, alternative factors and attributes may be used to determine whether to present the substitute ADFILE page. For instance, the proxy server program 16 may request a cookie providing identification information on the requesting client 8 to determine whether to present the substitute Web page. In this way, the proxy server program 16 could display information that is not relevant to the requested URL, but is relevant to the particular requesting client 8.

In the described embodiment, the substitute ADFILE Web page was presented if request attributes associated with the requesting client, such as requested URL, DNS name of requesting client, and time of day, matched predetermined values associated with the substitute ADFILE. However, in alternative embodiments, any combination of factors may be used independently or together to determine whether to present the substitute web page. For instance, a match of any one of the values for the REQUEST URL 24, DOMAIN NAME 26 or TIME OF DAY RANGE 28, or any combination thereof, could result in the return of the substitute ADFILE. Additional values or types of request attributes that could be associated with the requesting client may also be considered.

In preferred embodiments, there are separate network connections between the client 8 and the proxy 6 and between the proxy server 6 and servers 4*a, b, c*. For instance, the client 8 may connect to the proxy server 6 via a LAN, cable connection, etc., and the proxy server 6 may connect to the servers 4*a, b, c* via another network. In alternative embodiments, there may be additional network connections among the client 8, proxy server 6, and servers 4*a, b, c*. Alternatively, the client 8, proxy server 6, and servers 4*a, b, c* may connect to the same network. In such case, any attempt of the client 8 to connect to the servers 4*a, b, c* will initially be routed to the proxy server 6.

In summary, preferred embodiments in accordance with the present invention provide a method and system for processing a file request. A request is received from a processing system for a file at a file path location in a network. A request attribute associated with the request from the processing system is determined. Rule information indicating at least one substitute file and an attribute associated with each substitute file is processed to determine whether the determined request attribute matches an attribute associated with one substitute file. The substitute file associated with the attribute that matches the request attribute is retrieved after determining that the request attribute matches the attribute associated with the substitute file. The retrieved substitute file is then returned to the processing system via the network.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for processing a file request, comprising the steps of:

receiving a request from a client computer for a file at a file path location in a network;

determining one request attribute associated with the request from the client computer, wherein the determined request attribute is capable of comprising a domain name of the requested file, a time of the request, and a client network address used to communicate with the client computer on the network;

processing rule information indicating at least one substitute file and an attribute associated with each substitute file;

determining whether the determined request attribute matches an attribute associated with one substitute file;

retrieving the substitute file associated with the attribute that matches the request attribute after determining that the request attribute matches the attribute associated with the substitute file; and returning the retrieved substitute file to the client computer via the network.

2. The method of claim 1, wherein the file path location of the requested file is within a first server, wherein the first server, client computer, and a second server communicate over the network, and wherein the second server performs the steps of receiving the request, determining the request attribute, processing rule information, determining whether the request attribute matches, retrieving the substitute file, and returning the substitute file to the client computer.

3. The method of claim 2, wherein the step of retrieving the substitute file comprises the steps of:

determining, with the second server, whether the substitute file to retrieve is maintained in a cache;

retrieving, with the second server, the substitute file from the cache after determining that the substitute file to retrieve is in cache; and transmitting, with the second server, a request for the substitute file to retrieve to the first server after determining that the substitute file is not in cache.

4. The method of claim 1, wherein the rule information indicates a plurality of substitute files, and wherein at least one attribute is associated with each substitute file, wherein the step of determining the match comprises determining whether an attribute associated with one of the plurality of substitute files matches the request attribute.

5. The method of claim 1, wherein the attribute associated with each substitute file is a first attribute, wherein the request attribute is a first request attribute, wherein the rule information indicates a second attribute associated with each substitute file, further comprising the steps of:
   determining a second request attribute associated with the request from the client computer after determining that the first request attribute matches the first attribute associated with at least one substitute file;
   determining whether the second request attribute matches the second attribute associated with one substitute file that is associated with the first attribute that matches the first request attribute;
   retrieving the substitute file associated with the first and second attributes that match the first and second request attributes; and
   returning the retrieved substitute file to the client computer via the network.

6. The method of claim 1, wherein the attribute associated with the substitute file is a member of the set of attributes comprising a file path location, a family of addresses, and a time range, and wherein the request attribute associated with the request is a member of the set of request attributes comprising a file path location, an address identifier, and a time range.

7. The method of claim 1, further comprising the steps of modifying the retrieved substitute file to include a reference to the file path location of the requested file.

8. The method of claim 7, wherein the substitute file and requested file are in a Standard Generalized Markup Language (SGML) format, and wherein the step of modifying the retrieved substitute file comprises the step of including a hypertext reference to the file path location of the requested file in the substitute file.

9. The method of claim 7, further comprising the steps of:
   determining whether the received request was made from one of the substitute files indicated in the rule information;
   processing the rule information after determining that the request was not made from one of the substitute files; and
   returning the requested file to the processing system after determining that the request was made from one of the substitute files.

10. The method of claim 1, wherein the attribute associated with each substitute file is a file path location, wherein the step of determining the request attribute comprises determining the file path location of the requested file, and wherein the step of determining whether the request attribute matches the attribute associated with one substitute file comprises determining whether the file path location of the requested file matches the file path location attribute associated with one substitute file.

11. The method of claim 1, wherein the attribute associated with each substitute file is address identification information, wherein the step of determining the request attribute comprises determining address identification information for the client computer, and wherein the step of determining whether the request attribute matches the attribute associated with one substitute file comprises determining whether the address identification information for the client computer matches the address identification information attribute associated with one substitute file.

12. The method of claim 11, wherein the rule information further indicates a time range associated with each substitute file, further comprising the steps of:
   determining a time; and
   determining whether the determined time falls within the time range for the substitute file associated with the address identification attribute that matches the requested address identification information, wherein the step of retrieving the substitute file occurs after determining that the determined time falls within the time range.

13. The method of claim 1, further comprising the steps of:
   determining whether the requested file is of an appropriate file type before processing the rule information;
   processing the rule information after determining that the requested file is of the appropriate file type; and
   returning the requested file to the client computer after determining that the requested file is not of the appropriate type.

14. A system for processing a file request from a client computer system and for communicating with a network, comprising:
   a processing unit;
   a memory area storing rule information comprised of at least on substitute file and attribute information associated with each substitute file;
   a program executed by the processing unit, comprising:
      (i) means for receiving a file request from the client computer for a file at a first file path location in the network;
   means for determining whether the determined time falls within the time range for the substitute file associated with the address identification attribute that matches the requested address identification information, wherein the step of retrieving the substitute file occurs after determining that the determined time falls within the time range.

15. The system of claim 14, wherein the requested file is at a file path location within a server, wherein the processing units communicates with the server via the network.

16. The system of claim 15, further comprising a cache, and wherein the program executed by the processing unit further comprises:
   means for determining whether the substitute file to retrieve is maintained in the cache;
   retrieving the substitute file from the cache after determining that the substitute file to retrieve is in cache; and
   transmitting a request for the substitute file to retrieve to the server after determining that the substitute file is not in the cache.

17. The system of claim 14, wherein the rule information indicates a plurality of substitute files, and wherein at least one attribute is associated with each substitute file, wherein the step of determining the match comprises determining whether an attribute associated with one of the plurality of substitute files matches the request attribute.

18. The system of claim 14, wherein the attribute associated with each substitute file is a first attribute, wherein the request attribute is a first request attribute, wherein the rule information indicates a second attribute associated with each substitute file, and wherein the program logic further comprises:

means for determining a second request attribute associated with the request from the client computer after determining that the first request attribute matches the first attribute associated with at least one substitute file;

means for determining whether the second request attribute matches the second attribute associated with one substitute file that is associated with the first attribute that matches the first request attribute;

means for retrieving the substitute file associated with the first and second attributes that match the first and second request attributes; and means for returning the retrieved substitute file to the client computer via the network.

19. The system of claim 14, wherein the attribute associated with the substitute file is a member of the set of attributes comprising a file path location, a family of addresses, and a time range, and wherein the request attribute associated with the request is a member of the set of request attributes comprising a file path location, an address identifier, and a time range.

20. The system of claim 14, wherein the program further comprises means for modifying the retrieved substitute file to include a reference to the file path location of the requested file.

21. The system of claim 20, wherein the substitute file and requested file are in a Standard Generalized Markup Language (SGML) format, and wherein the means for modifying the retrieved substitute file includes a hypertext reference to the file path location of the requested file in the substitute file.

22. The system of claim 20, wherein the program further comprises:

means for determining whether the received request was made from one of the substitute files indicated in the rule information;

means for processing the rule information after determining that the request was not made from one of the substitute files; and means for returning the requested file to the processing system after determining that the request was made from one of the substitute files.

23. The system of claim 14, wherein the attribute associated with each substitute file is a file path location, wherein the means for determining the request attribute determines the file path location of the requested file, and wherein the means for determining whether the request attribute matches the attribute associated with one substitute file determines whether the file path location of the requested file matches the file path location attribute associated with one substitute file.

24. The system of claim 14, wherein the attribute associated with each substitute file is address identification information, wherein the means for determining the request attribute determines address identification information for the client computer, and wherein the step of determining whether the request attribute matches the attribute associated with one substitute file comprises determining whether the address identification information for the client computer matches the address identification information attribute associated with one substitute file.

25. The system of claim 24, wherein the rule information further indicates a time range associated with each substitute file, wherein the program further comprises:

means for determining a time; and means for determining whether the determined time falls within the time range for the substitute file associated with the address identification attribute that matches the requested address identification information, wherein the step of retrieving the substitute file occurs after determining that the determined time falls within the time range.

26. The system of claim 14, wherein the program further comprises:

means for determining whether the requested file is of an appropriate file type before processing the rule information;

means for processing the rule information after determining that the requested file is of the appropriate file type; and means for returning the requested file to the client computer after determining that the requested file is not of the appropriate type.

27. An article of manufacture for use in programming a computer system to process a file request from a client computer and for communicating with a network, the article of manufacture comprising computer readable storage media accessible to the computer system, wherein the computer readable storage media has at least one computer program embedded therein that causes the computer system to perform:

receiving a request from the client computer for a file at a first file path location in the network;

determining one request attribute associated with the request from the client computer, wherein the determined request attribute comprises at least one of a domain name of the requested file, a time of the request, and a client network address used to communication with the client computer on the network;

processing rule information indicating at least one substitute file and an attribute associated with each substitute file;

determining whether the determined request attribute matches an attribute associated with one substitute file;

retrieving the substitute file associated with the attribute that matches the determined request attribute after determining that the request attribute matches the attribute associated with the substitute file, wherein the retrieved substitute file is at a second file path location in the network different from the first file path location; and returning the retrieved substitute file to the processing system via the network.

28. The article of manufacture of claim 27, wherein the requested file is at a file path location within a server, wherein the computer system is capable of communicating with the server via the network.

29. The article of manufacture of claim 28, wherein the step of retrieving the substitute file comprises the steps of:

determining whether the substitute file to retrieve is maintained in a cache;

retrieving the substitute file from the cache after determining that the substitute file to retrieve is in cache; and transmitting a request for the substitute file to retrieve to the server after determining that the substitute file is not in cache.

30. The article of manufacture of claim 27, wherein the rule information indicates a plurality of substitute files, and wherein at least one attribute is associated with each substitute file, wherein the step of determining the match comprises determining whether an attribute associated with one of the plurality of substitute files matches the request attribute.

31. The article of manufacture of claim 27, wherein the attribute associated with each substitute file is a first attribute, wherein the request attribute is a first request attribute, wherein the rule information indicates a second attribute associated with each substitute file, further causing the computer system to perform the steps of:
- determining a second request attribute associated with the request from the client computer after determining that the first request attribute matches the first attribute associated with at least one substitute file;
- determining whether the second request attribute matches the second attribute associated with one substitute file that is associated with the first attribute that matches the first request attribute;
- retrieving the substitute file associated with the first and second attributes that match the first and second request attributes; and
- returning the retrieved substitute file to the client computer via the network.

32. The article of manufacture of claim 27, wherein the attribute associated with the substitute file is a member of the set of attributes comprising a file path location, a family of addresses, and a time range, and wherein the request attribute associated with the request is a member of the set of request attributes comprising a file path location, an address identifier, and a time range.

33. The article of manufacture of claim 27, further causing the computer system to perform the step of modifying the retrieved substitute file to include a reference to the file path location of the requested file.

34. The article of manufacture of claim 33, wherein the substitute file and requested file are in a Standard Generalized Markup Language (SGML) format, and wherein the step of modifying the retrieved substitute file comprises the step of including a hypertext reference to the file path location of the requested file in the substitute file.

35. The article of manufacture of claim 33, further causing the computer system to perform the steps of:
- determining whether the received request was made from one of the substitute files indicated in the rule information;
- processing the rule information after determining that the request was not made from one of the substitute files; and
- returning the requested file to the processing system after determining that the request was made from one of the substitute files.

36. The article of manufacture of claim 27, wherein the attribute associated with each substitute file is a file path location, wherein the step of determining the request attribute comprises determining the file path location of the requested file, and wherein the step of determining whether the request attribute matches the attribute associated with one substitute file comprises determining whether the file path location of the requested file matches the file path location attribute associated with one substitute file.

37. The article of manufacture of claim 27, wherein the attribute associated with each substitute file is address identification information, wherein the step of determining the request attribute comprises determining address identification information for the client computer, and wherein the step of determining whether the request attribute matches the attribute associated with one substitute file comprises determining whether the address identification information for the client computer matches the address identification information attribute associated with one substitute file.

38. The article of manufacture of claim 37, wherein the rule information further indicates a time range associated with each substitute file, further comprising the steps of:
- determining a time; and
- determining whether the determined time falls within the time range for the substitute file associated with the address identification attribute that matches the requested address identification information, wherein the step of retrieving the substitute file occurs after determining that the determined time falls within the time range.

39. The article of manufacture of claim 27, further comprising the steps of:
- determining whether the requested file is of an appropriate file type before processing the rule information;
- processing the rule information after determining that the requested file is of the appropriate file type; and
- returning the requested file to the client computer after determining that the requested file is not of the appropriate type.

* * * * *

UNITED STATES PATENT AND TRADEMARK OFFICE
CERTIFICATE OF CORRECTION

PATENT NO.    : 6,397,246 B1
DATED         : May 28, 2002
INVENTOR(S)   : Daniel Charles Wolfe

It is certified that error appears in the above-identified patent and that said Letters Patent is hereby corrected as shown below:

Column 12,
Lines 35-41, claim 14, please delete the paragraph:
 "means for determining whether the determined time falls within the time range for the substitute file associated with the address identification attribute that matches the requested address identification information, wherein the step of retrieving the substitute file occurs after determining that the determined time falls within the time range."
and insert:
  -- (ii) means for determining one request attribute associated with the request from the client computer, wherein the determined request attribute comprises at least one of a domain name of the requested file, a time of the request, and a client network address used to communication with the client computer on the network;
  (iii) means for processing the rule information to determine whether the determined request attribute matches an attribute associated with one substitute file;
  (iv) means for retrieving the substitute file associated with the attribute that matches the request attribute after determining that the request attribute matches the attribute associated with the substitute file, wherein the retrieved substitute file is at a second file path location in the network different form the first file path location; and
  (v) means for returning the retrieved substitute file to the client computer via the network. --
Line 45, please delete "units" and insert -- unit -- therefore Column 14,
Line 50, delete "incapable of communicating" and insert -- communicates --

Signed and Sealed this

Ninth Day of November, 2004

JON W. DUDAS
*Director of the United States Patent and Trademark Office*